US010465587B2

(12) United States Patent
Krüger et al.

(10) Patent No.: US 10,465,587 B2
(45) Date of Patent: Nov. 5, 2019

(54) MUFFLER FOR AN EXHAUST SYSTEM OF AN INTERNAL COMBUSTION ENGINE, ESPECIALLY FOR MOTOR VEHICLES WITH HYBRID DRIVE

(71) Applicant: Eberspächer Exhaust Technology GmbH & Co. KG, Neunkirchen (DE)

(72) Inventors: Jan Krüger, Neuhausen (DE); Gerd Gaiser, Reutlingen (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 240 days.

(21) Appl. No.: 15/601,351

(22) Filed: May 22, 2017

(65) Prior Publication Data

US 2017/0335741 A1    Nov. 23, 2017

(30) Foreign Application Priority Data

May 23, 2016    (DE) .................. 10 2016 109 388

(51) Int. Cl.

| F01N 5/02 | (2006.01) |
| F01N 1/16 | (2006.01) |
| B60W 20/16 | (2016.01) |
| B60W 20/17 | (2016.01) |
| F01N 1/02 | (2006.01) |
| F01N 1/08 | (2006.01) |
| F01N 1/10 | (2006.01) |

(52) U.S. Cl.
CPC .............. F01N 5/02 (2013.01); F01N 1/026 (2013.01); F01N 1/163 (2013.01); F01N 1/165 (2013.01);

(Continued)

(58) Field of Classification Search
CPC . F01N 5/02; F01N 1/163; F01N 1/165; F01N 2240/02; F01N 2240/36;
(Continued)

(56) References Cited

U.S. PATENT DOCUMENTS 8,689,925 B2 *  4/2014  Ajisaka ................. F01N 3/2006
                                                                180/309
9,306,143 B2    4/2016  Ranalli et al.
(Continued)

FOREIGN PATENT DOCUMENTS

CN    2498343 Y    7/2002
CN    1977132 A    6/2007
(Continued)

*Primary Examiner* — Jeremy A Luks
(74) *Attorney, Agent, or Firm* — McGlew and Tuttle, P.C.

(57) ABSTRACT

A muffler for an exhaust system of an internal combustion engine, especially for vehicles with hybrid drive, includes a muffler housing (12), a heat exchanger unit (48), arranged in the muffler housing (12), for transferring heat from combustion exhaust gas to a heat transfer medium, an inlet pipe (38), a first outlet pipe (52) and a second outlet pipe (40). A first exhaust gas flow path (54), in the muffler housing, routs exhaust gas through the heat exchanger unit (48) to the first outlet pipe (52). A second exhaust gas flow path (56), in the muffler housing, routs exhaust gas to a second outlet pipe (40), bypassing the heat exchanger unit (48). A flow path blocking/releasing device (58) for blocking and releasing at least one exhaust gas flow path (54, 56), of the first exhaust gas flow path (54) and of the second exhaust gas flow path (56).

20 Claims, 1 Drawing Sheet

(52) U.S. Cl.
CPC ............ *B60W 20/16* (2016.01); *B60W 20/17* (2016.01); *F01N 1/089* (2013.01); *F01N 1/10* (2013.01); *F01N 1/166* (2013.01); *F01N 2240/02* (2013.01); *F01N 2240/36* (2013.01); *F01N 2260/14* (2013.01); *F01N 2410/02* (2013.01); *F01N 2410/03* (2013.01); *F01N 2470/02* (2013.01); *F01N 2470/14* (2013.01); *F01N 2490/04* (2013.01); *F01N 2490/14* (2013.01); *F01N 2590/11* (2013.01); *Y02T 10/16* (2013.01)

(58) Field of Classification Search
CPC ............ F01N 2410/02; F01N 2410/03; F01N 2590/11; F01N 2470/14; B60W 20/16; B60W 20/17; Y02T 10/16
See application file for complete search history.

(56) References Cited

U.S. PATENT DOCUMENTS

| | | | | |
|---|---|---|---|---|
| 2006/0027420 | A1* | 2/2006 | Hahnl | ............... F01N 1/165 181/283 |
| 2006/0054381 | A1* | 3/2006 | Takemoto | ............... F01N 1/003 181/237 |
| 2007/0045043 | A1 | 3/2007 | Hoerr et al. | |
| 2012/0024507 | A1 | 2/2012 | Paze | |
| 2013/0240284 | A1* | 9/2013 | Ajisaka | ............... F01N 3/2006 180/309 |
| 2016/0169075 | A1* | 6/2016 | Dobryden | ............... F01N 5/02 165/138 |
| 2017/0241320 | A1* | 8/2017 | Sloss | ............... F01N 5/02 |
| 2018/0073412 | A1* | 3/2018 | Ekstrom | ............... F01N 1/24 |

FOREIGN PATENT DOCUMENTS

| | | | |
|---|---|---|---|
| DE | 20 2011 110 189 U1 | 1/2013 | |
| DE | 10 2012 104 396 A1 | 11/2013 | |
| EP | 1 760 279 A2 | 3/2007 | |
| EP | 2 559 870 A1 | 2/2013 | |
| EP | 2 733 322 A1 | 5/2014 | |
| JP | S48-34004 B | 10/1973 | |
| JP | S62-102813 U | 6/1987 | |
| JP | S62-240415 A | 10/1987 | |
| JP | H01-88017 U | 6/1989 | |
| JP | 2007-032561 A | 2/2007 | |
| JP | 2007-113559 A | 5/2007 | |
| JP | 2015137620 A * | 7/2015 | ............... F02G 5/02 |

* cited by examiner

MUFFLER FOR AN EXHAUST SYSTEM OF AN INTERNAL COMBUSTION ENGINE, ESPECIALLY FOR MOTOR VEHICLES WITH HYBRID DRIVE

CROSS REFERENCE TO RELATED APPLICATIONS

This application claims the benefit of priority under 35 U.S.C. § 119 of German Application DE 10 2016 109 388.2, filed May 23, 2016, the entire contents of which are incorporated herein by reference.

FIELD OF THE INVENTION

The present invention pertains to a muffler for an exhaust system of an internal combustion engine, and the present invention pertains, in particular, to mufflers that may be provided in motor vehicles with hybrid drive associated with the internal combustion engines used there.

BACKGROUND OF THE INVENTION

A muffler designed for an exhaust system of an internal combustion engine of a motor vehicle, in which a heat exchanger unit is integrated in order to make it possible to transfer heat being transported in the combustion exhaust gases discharged by the internal combustion engine to a heat transfer medium, for example, to the cooling liquid flowing in a closed coolant circuit of an internal combustion engine, is known from DE 10 2012 104 396 A1. The muffler has an inlet pipe and an outlet pipe. A first flow path blocking/releasing member is associated with the inlet pipe, and a second flow path blocking/releasing member is associated with the heat exchanger unit. These two flow path blocking/releasing members can be brought, coordinated with one another, into such blocked or released positions that the combustion exhaust gas entering via the inlet pipe takes either a first flow path, in which it flows through the heat exchanger unit for heat transfer to a heat transfer medium and leaves the outlet pipe after flowing through the heat exchanger unit, or, to avoid such a heat transfer interaction between the exhaust gas and the heat transfer medium, it takes a second flow path, in which it does not flow through the heat exchanger unit and, after leaving the inlet pipe, it flows directly to the outlet pipe, bypassing the heat exchanger unit, and is discharged from said outlet pipe.

EP 2 733 322 A1 discloses a muffler with a heat exchanger unit integrated in same. The muffler has two inlet pipes and one outlet pipe. The exhaust gas leaving the internal combustion engine can be sent through the flow path blocking/releasing member via a first of the inlet pipes and thus a first flow path, in which the exhaust gas flows through the heat exchanger unit and can transfer heat to a heat transfer medium before it leaves the muffler via the outlet pipe. In another position of the flow path blocking/releasing member, the exhaust gas is sent via the second of the inlet pipes to a second flow path, in which it flows to the outlet pipe and leaves the muffler via the outlet pipe without thermal interaction with the heat transfer medium.

The problem arises, especially in motor vehicles with hybrid drives, that, on the one hand, the space available for the installation of an exhaust system and especially for the muffler or mufflers integrated in same is comparatively limited due to the batteries being accommodated in the bottom area. On the other hand, increasingly strict legal requirements require a reduction of the noises released by such a vehicle, which makes it, in turn, necessary to use larger mufflers. Furthermore, the internal combustion engines used in motor vehicles and especially in hybrid drives are so efficient that the waste heat provided by these during the combustion operation is frequently insufficient for a sufficient thermal conditioning of the interior of a vehicle. The use of comparatively large mufflers with heat exchanger units integrated in them for utilizing the heat being transported in the combustion exhaust gas is, however, difficult because of the crowded space conditions especially in the bottom area of such vehicles, taking into account the fact that there also are requirements imposed on the muffling properties.

SUMMARY OF THE INVENTION

An object of the present invention is to provide a muffler for an exhaust system of an internal combustion engine, especially for motor vehicles with hybrid drive, which muffler, having a compact configuration and good muffling characteristics, makes possible the utilization of the heat being transported in the combustion exhaust gas.

This object is accomplished according to the present invention by a muffler for an exhaust system of an internal combustion engine, especially for motor vehicles with hybrid drive, comprising:
 a muffler housing,
 a heat exchanger unit for transmitting heat from the combustion exhaust gas to the heat transfer medium, which heat exchanger unit is arranged in the muffler housing and through which a heat transfer medium and combustion exhaust gas can flow,
 an inlet pipe admitting combustion exhaust gas into the muffler housing,
 a first outlet pipe removing combustion exhaust gas from the muffler housing, wherein a first exhaust gas flow path is provided in the muffler housing for sending combustion exhaust gas through the heat exchanger unit to the first outlet pipe,
 a second outlet pipe drawing off combustion exhaust gas from the muffler housing, wherein a second exhaust gas flow path is provided in the muffler housing for sending combustion exhaust gas to the second outlet pipe, bypassing the heat exchanger unit, and
 a flow path blocking/releasing device for blocking and releasing at least one exhaust gas flow path from the first exhaust gas flow path and the second exhaust gas flow path as desired.

The two exhaust gas flow paths are configured in the concept according to the present invention of a muffler according to the present invention such that the combustion exhaust gas either flows through the heat exchanger unit or it bypasses the heat exchanger unit and the combustion exhaust gas leaves the muffler via different outlet pipes depending on which exhaust gas flow paths the combustion exhaust gas is sent through. This makes it possible to configure the muffler, with a compact design, such that it can meet the generally existing requirements concerning the muffling properties.

To make it possible to release or block the flow paths provided in the muffler according to the present invention in a specific manner, it is proposed that the flow path blocking/releasing device comprise a flow path blocking/releasing member associated with the first outlet pipe, wherein the flow path blocking/releasing member is adjustable between a released position, in which the first outlet pipe is released for the flow, and a blocked position, which essentially blocks the first outlet pipe against flow, wherein the flow path blocking/releasing member is preferably arranged in the first outlet pipe in an area outside the muffler housing, or/and that the flow path blocking/releasing device comprises a flow path blocking/releasing member associated with the second outlet pipe, wherein the flow path blocking/releasing member is adjustable between a released position releasing the second outlet pipe for flow and a blocked position essentially blocking the second outlet pipe against flow, wherein the flow path blocking/releasing member is preferably arranged in the second outlet pipe in an area outside the muffler housing.

It is proposed for a good muffling characteristic, on the one hand, and for a branching of the two exhaust gas flow paths, on the other hand, that a first chamber be provided in the muffler housing, the inlet pipe being open towards the first chamber, and that the first exhaust gas flow path comprise the first chamber and that the heat exchanger unit have an exhaust gas inlet area open to the first chamber and an exhaust gas outlet area open to the first outlet pipe.

Further, the muffling characteristic can be favorably influenced by a second chamber being provided in the muffler housing, the second chamber being filled at least partly with muffling material, the inlet pipe preferably being open towards the second chamber. To support an efficient muffling by absorption, it is proposed that the inlet pipe or a pipe connected to the inlet pipe or forming an extension of the inlet pipe pass through the second chamber and have an opening arrangement open to the second chamber.

Provisions may further be made for the second outlet pipe or a pipe connected to the second outlet pipe or forming an extension of the second outlet pipe to be open towards the second chamber. Provisions may be made here with an embodiment having an especially simple design for an exhaust gas pipe providing the inlet pipe and the second outlet pipe to pass through the first chamber and the second chamber and to be open to the second chamber by means of the opening arrangement, It is proposed in another embodiment, which is advantageous for reducing the sound emission, that a third chamber be provided in the muffler housing, the second outlet pipe or a pipe connected to the second outlet pipe or forming an extension of the second outlet pipe being open to the third chamber.

Provisions may be made, for accommodating the heat exchanger unit in the muffler housing, for a fourth chamber being provided in the muffler housing, which said chamber contains the heat exchanger unit at least partially, said fourth chamber being open in the area of the exhaust gas inlet area to the first chamber and the first outlet pipe or a pipe connected to the first outlet pipe or forming an extension of the first outlet pipe being open in the area of the exhaust gas inlet area to the fourth chamber. A defined exhaust gas routing is thus guaranteed from the first chamber through the fourth chamber to the first outlet pipe, and the exhaust gas flows through or around the heat exchanger unit in the fourth chamber at the same time and transfers heat in the process to the heat transfer medium also circulating in this chamber.

To provide a Helmholtz resonator functionality, it is proposed that the inlet pipe or a pipe connected to the inlet pipe or forming an extension of the inlet pipe be open to the first chamber via a branch pipe branching off from it. Furthermore, provisions may be made in this configuration for improving the muffling characteristics for the second outlet pipe or a pipe connected to the second outlet pipe or forming an extension of the second outlet pipe to be open to the third chamber via an opening arrangement. The flow path blocking/releasing device may now comprise a flow path blocking/releasing member associated with the first outlet pipe. If this flow path blocking/releasing member is in its blocked position, it blocks the first outlet pipe against flow, so that no combustion exhaust gas can inevitably flow through the heat exchanger unit, either, but the total amount of combustion exhaust gas introduced into the muffler via the inlet pipe leaves the muffler via the second outlet pipe released basically for flow.

Provisions may be made in an alternative embodiment for the inlet pipe or a pipe connected to the inlet pipe or forming an extension of the inlet pipe to be open to the first chamber via an opening arrangement. The combustion exhaust gas now enters the first chamber via the opening arrangement, i.e., generally a perforation, of the inlet pipe or of a pipe forming an extension of this pipe, and it enters the heat exchanger unit via the first chamber. To make it possible to provide the Helmholtz resonator functionality in this configuration as well, it is further proposed that the second outlet pipe or a pipe connected to the second outlet pipe or forming an extension of the second outlet pipe be open to the third chamber via a branch pipe branching off from it.

A flow path blocking/releasing member of the flow path blocking/releasing device is advantageously associated with the second outlet pipe in this embodiment. If this flow path blocking/releasing member is in its blocked position, it blocks the second outlet pipe against flow, so that the combustion exhaust gas inevitably entering the muffler via the inlet pipe is sent via the opening arrangement into the first chamber and from this to the heat exchanger unit and hence to the first outlet pipe.

Since such mufflers are configured, in general, as mufflers elongated in the direction of a longitudinal axis of the muffler for reasons of a compact design, it is further proposed that the first chamber and the second chamber be arranged such that they follow each other in the direction of a longitudinal axis of the muffler housing. In particular, provisions may be made in such a design for the second chamber to be arranged between the first chamber and the second chamber in the direction of the longitudinal axis of the muffler housing.

To simultaneously allow the different configuration features of a muffler for providing a good muffling characteristic, especially a Helmholtz resonator functionality, while the space required for installation is limited, it is further proposed that the second chamber and the fourth chamber be arranged next to one another in at least some areas in the direction of a longitudinal axis of the muffler housing. An efficient muffling can thus be achieved on at least one axial side of the second chamber or of the fourth chamber, for example, in the first chamber or in the third chamber by providing a Helmholtz resonator.

Further, the present invention pertains to an exhaust system for a vehicle, especially one with a hybrid drive, comprising a muffler configured according to the present invention.

The present invention will be described below in detail with reference to the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
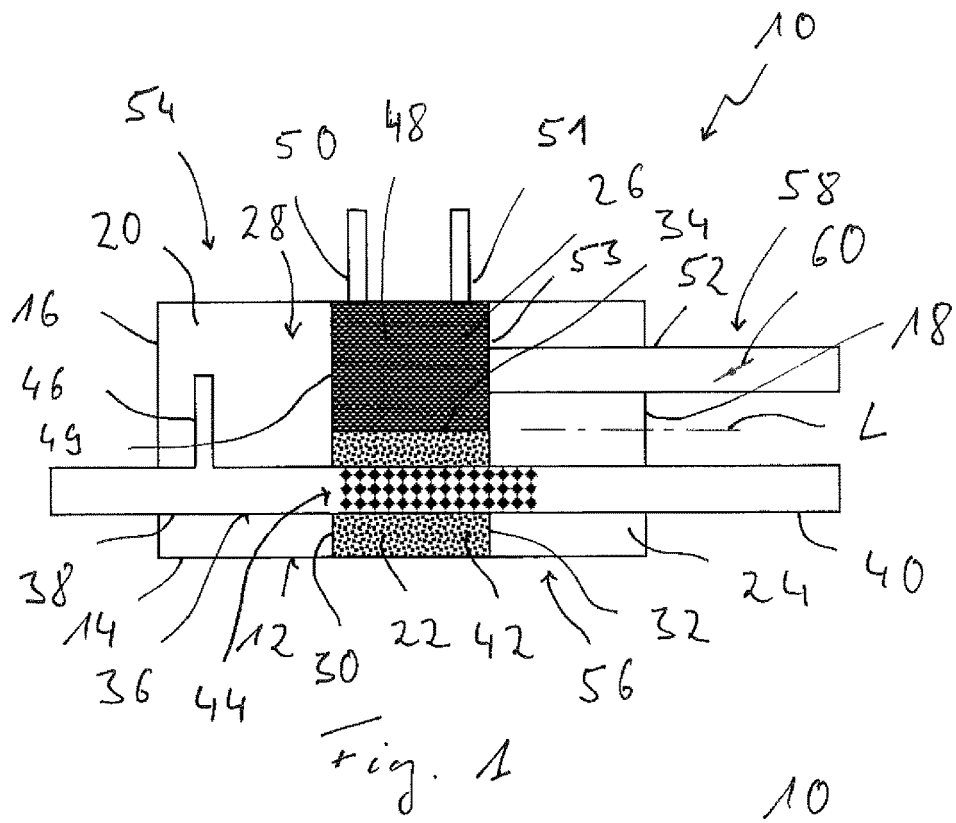
FIG. 1 is a schematic sectional view of a muffler with integrated heat exchanger unit.

Referring to the drawings, a muffler provided for being integrated in an exhaust system of a vehicle, configured, for example, with hybrid drive, is generally designated by 10 in FIG. 1. This muffler is arranged in the exhaust system downstream of system areas provided, in general, for exhaust gas purification, e.g., catalytic converter or/and particle filter, and upstream of at least one rear muffler.

The muffler 10 comprises a muffler housing 12, which is configured, for example, elongated in the direction of a longitudinal axis L of the muffler housing, and may have an essentially cylindrical circumferential wall 14 with, e.g., round or elliptical cross-sectional geometry. The muffler housing 12 is closed at the two axial end areas by front walls 16, 18 connected in a gas-tight manner to the circumferential wall 14, for example, by welding or in another manner.

A total of four chambers 20, 22, 24, 26 are formed in the interior of the muffler housing 12 in the embodiment shown in FIG. 1. The first chamber 20 is arranged on an inlet side of the muffler housing 12. The first chamber 20 may occupy, for example, the entire cross section of the muffler housing 12 or of the interior 28 of the muffler housing 12. The second chamber 22, which may be separated from the first chamber 20 by a partition 30 and which occupies only a partial area of the cross section of the interior 28, is provided axially adjoining the first chamber 20. The third chamber 24, which is separated from the second chamber 22 by a partition 32 and can likewise occupy, just as the first chamber 20, the entire cross section of the interior 28, is arranged such that it axially follows the second chamber 22.

The fourth chamber 26 is arranged in the direction of the longitudinal axis L of the muffler housing next to the second chamber 22 and hence also between the first chamber 20 and the third chamber 24. The fourth chamber 26 may be separated, from the first chamber 20 and from the second chamber 22, by the partitions 30, 32. However, the chambers 22, 26 could, in principle, also be separated from the first chamber 20 and the third chamber 24 by these respectively associated partitions. Further, the fourth chamber 26 is separated from the second chamber 22 by a partition 34, so that there is, in principle, no flow connection between these two chambers 22, 26.

In its area that also passes through the first chamber 20, an exhaust pipe generally designated by 36 provides an inlet pipe 38, which passes through the front wall 16 and via which the combustion exhaust gas leaving an internal combustion engine is introduced into the interior 28 of the muffler housing 12. In an area also passing through the third chamber 24, the exhaust pipe 36 provides an outlet pipe 40, which passes through the front wall 18 and via which the exhaust gas fed via the inlet pipe 38 can leave the muffler 10. The exhaust pipe 36 passes through the partitions 30, 32 and is thus led through the second chamber 22. The second chamber 22 is filled with, for example, fibrous, foam-like or porous muffling material 42, which surrounds the exhaust pipe 36 in its area passing through the second chamber 22.

The exhaust pipe 36 is configured in this area passing through the second chamber 22 and in a partial area of the length areas passing through the third chamber 24 with an opening arrangement 44, generally also called perforation, and is thus open via a plurality of openings to the second chamber 22, on the one hand, and to the third chamber 24, on the other hand.

A branch pipe 46 branches laterally off from the exhaust pipe 36 in the length area of the exhaust pipe 36 extending in the first chamber 20, i.e., for example, in the length area that can be interpreted as an inlet pipe 38. This branch pipe thus extends at right angles to the longitudinal axis L of the muffler housing and is open towards the second chamber 20, so that exhaust gas fed via the inlet pipe 38 can enter the first chamber 20.

It should be noted here that the exhaust gas pipe 36 passing through the chambers 20, 22, 24 may be configured as an integral pipe section. The inlet pipe 38 and the outlet pipe 40 could, however, also be provided, in principle, as components configured separately from one another, which are connected to one another or are connected to one another via an additional pipe. Further, the inlet pipe 38 and the outlet pipe 40 may be led out of the interior space 28 of the muffler housing 12 via the front walls 16, 18 in the length areas in which they pass through these front walls 16, 18, as is shown in FIG. 12. As an alternative, the inlet pipe 38 or/and the outlet pipe 40 could also end in the area of a front wall 16, 18, through which it passes, and be extended there towards the outside by an additional pipe.

A heat exchanger unit generally designated by 48 is provided in the fourth chamber 26. Heat transfer medium 50, for example, the cooling liquid of an internal combustion engine, can flow into the heat exchanger unit 48 through a heat transfer medium inlet 50. The heat transfer medium can leave the heat exchanger unit 48 via a heat transfer medium outlet 51. A volume, through which the heat transfer medium can flow, is provided, for example, in a plurality of ducts in the interior of the heat exchanger unit 48. The heat exchanger unit 48 is advantageously inserted into the fourth chamber 26 defined by the circumferential wall 14, the two partitions 30, 32 and the partition 34, but it may also provide, as an alternative, at least one of these partitions or a part of the circumferential wall 14 itself.

To make possible a heat transfer interaction between the combustion exhaust gas introduced into the first chamber 20 and the heat transfer medium flowing through the heat exchanger unit 48, the heat exchanger unit 48 or the partition 30 is open in its area defining the fourth chamber 26 towards the first chamber 20. For example, in this area of the partition 30, a plurality of openings, via which the combustion exhaust gas flowing into the first chamber 20 can flow into volume areas provided for this purpose in the heat exchanger unit 48 in an exhaust gas inlet area 49 in order to transfer heat being transported in the combustion exhaust gas to the heat transfer medium flowing in the heat transfer medium flow volume of the heat exchanger unit 48.

Another outlet pipe 52 passes through the front wall 18 and the third chamber 24 and is open towards the fourth chamber 26, for example, in the area of the partition 32. After flowing through or bypassing the heat exchanger unit 48, the combustion exhaust gas flowing into the fourth chamber 26 via the first chamber 20 for flowing through the heat exchanger unit 48 can leave the fourth chamber 26 or the heat exchanger unit via an exhaust gas outlet area 53 via the outlet pipe 52.

It should be noted that the outlet pipe 40 will hereinafter be called second outlet pipe and the outlet pipe 52 will be called first outlet pipe.

Using the only inlet pipe 38 and the two outlet pipes 40, 52, two exhaust gas flow paths 54, 56 are formed in the muffler 10. The combustion exhaust gas entering the interior space 28, especially the first chamber 20, via the inlet pipe 38 via the first exhaust gas flow path 54 flows through the fourth chamber 26 and thus through the heat exchanger unit 48 and leaves the interior space 28 via the first outlet pipe 52. The second exhaust gas flow path 56 routes the exhaust gas being routed via the inlet pipe 38 into the interior space 28 of the muffler housing 12 to the second outlet pipe 40, bypassing heat exchanger unit 48 and thus avoiding a heat transfer interaction between the combustion exhaust gas flowing in the exhaust gas flow path and the heat transfer medium, and leaves the interior space 28 of the muffler housing 12 via this outlet pipe 40.

The muffler 10 further comprises a flow path blocking/releasing device 58 associated with the first flow gas flow path 54. This device may comprise, for example, a flow path blocking/releasing member 60, for example, a pivotable flap, integrated into the first outlet pipe 52 preferably at an area outside the muffler housing 12. The flow path blocking/releasing member 60 is adjustable between a blocked position essentially blocking the first outlet pipe 52 and hence the first exhaust gas flow path 54 against the flow of combustion exhaust gas and a released position, in which the first outlet pipe 52 and hence the first exhaust gas flow path 54 are released for flow. The flow path blocking/releasing member 60 may be adjustable such that it can assume either the blocked position or the released position, or it can also assume intermediate positions in addition to these two positions and is preferably continuously adjustable between these two positions in order to make it possible to continuously set the blocking of the first exhaust gas flow path 54 and hence the percentage of combustion exhaust gas flowing over this. It should be noted here that the flow path blocking/releasing member can be adjusted between the different positions by means of a corresponding actuating drive, for example, an electric motor or the like. No such flow path blocking/releasing member is associated with the exhaust gas flow path 56, so that this is basically released for flow.

The operation of the muffler 10 shown in FIG. 1 will be described below.

Depending on the amount of heat needed in a vehicle or/and the operating state of an internal combustion engine, the muffler 10 is used such that the percentage of the combustion exhaust gas flowing over the first flow path 54 is varied by releasing or blocking or partially blocking, as desired, this first exhaust gas flow path 54. If a comparatively large amount of heat is needed, i.e., a comparatively large quantity of heat shall be transferred from the combustion exhaust gas to the heat transfer medium flowing through the heat exchanger unit, the flow path blocking/releasing member 60 is brought into its released position, in which the first exhaust gas flow path 54 is basically released for the flow, i.e., the blocking generated by the flow path blocking/releasing device 58 is minimal. Both exhaust gas flow paths 54, 56 are released in this state, and the combustion exhaust gas entering via the inlet pipe 38 leaves the muffler 10 via the two outlet pipes 52, 40 and is sent via these, for example, to the rear muffler already mentioned above. The combustion exhaust gas flowing in the first exhaust gas flow path 54 now transfers heat to the heat transfer medium, flowing through the heat exchanger unit 46, and this heat can be utilized in another heat exchanger unit, for example, in order to heat the air to be introduced into the interior of the vehicle.

If no or only a small amount of heat is needed, the flow path blocking/releasing member 60 is brought into its blocked position or into a position in which it blocks the second exhaust gas flow path 56 to a greater extent, so that no combustion exhaust gas or only a lower percentage of the combustion exhaust gas will flow through the second exhaust gas flow path 56; for example, the total quantity of combustion exhaust gas flows through the muffler 10 over the second exhaust gas flow path 56 and combustion exhaust gas is also sent only via the second outlet pipe 40 to the system areas of an exhaust system located farther downstream. The inlet pipe 38 or the branch pipe 46 branched off from this now forms in the first chamber 20 a Helmholtz resonator, whose resonator volume extends, for example, to the flow path blocking/releasing member 60, which is positioned in its blocked position. This volume is advantageously selected to be such that a tuning of the resonance frequency of the Helmholtz resonator thus formed to especially disturbing low frequencies is achieved.

The second chamber 22, filled with the muffling material 42, makes a further contribution to the muffling, and this chamber thus acts as an absorption chamber and is especially effective for reducing high frequencies, generated, for example, by the flow noise. At the same time, a heat insulation to the heat exchanger unit 48 is also provided due to the second exhaust gas flow path 56 being separated due to the design from the heat exchanger unit 48, especially also due to the insulating effect of the second chamber 22 and of the muffling material 42 arranged therein, so that it is ensured in this state that a thermal overload on the heat exchanger unit is avoided and heating of the heat transfer medium flowing through the heat exchanger unit 48 is at the same time extensively avoided.

This operating state is selected especially when excessively high exhaust gas temperatures could lead to an overload of the heat exchanger unit, on the one hand, i.e., for example, in the full-load state or at nominal speed of an internal combustion engine, or efficient heating of the heat transfer medium in the heat exchanger unit 48 cannot be achieved because of a small amount of heat being transported in the combustion exhaust gas and the muffling functionality is therefore given priority. This may happen, for example, in an operating state with low speed, for example, at idle speed, in which attenuation of low frequencies by the Helmholtz resonator is above all necessary as well.

The above-described state, in which the first exhaust gas flow path 54 is also released for flow, is preferably selected, due to the fact that the Helmholtz functionality can hardly be attained only conditionally in this state due to the first exhaust pipe 52 being open, when efficient utilization of the heat being transported in the combustion exhaust gas is possible without the risk of overheating of the heat exchanger unit 48, on the one hand, and there is a lower requirement on the muffling capacity, on the other hand. This is generally the state in which an internal combustion engine is operated in the range of medium speeds or medium engine load.

It should be noted that the embodiment shown in FIG. 1 may also be varied in such a way that the third chamber 24 is eliminated if this is allowed by the requirements imposed on muffling. This leads to an even more compact design of the muffler 10.

Figure 2:
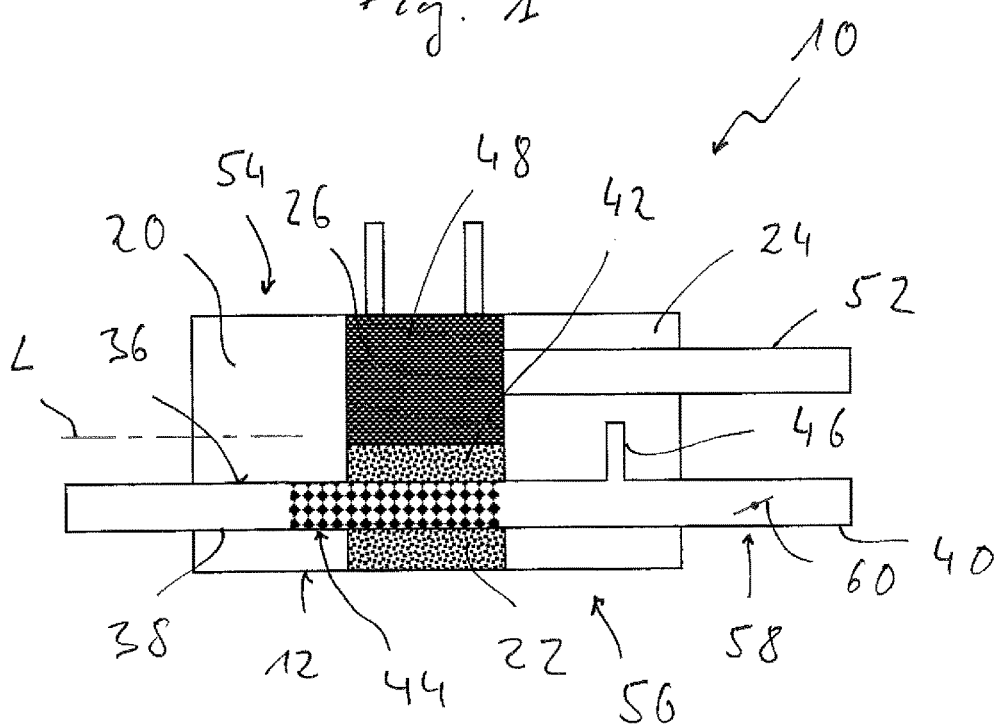
FIG. 2 is a view of a muffler with integrated heat exchanger unit according to an alternative embodiment, which view corresponds to FIG. 1.

The embodiment shown in FIG. 2 corresponds in terms of the basic configuration and the two exhaust gas flow paths essentially to the embodiment described above with reference to FIG. 1. The first exhaust gas flow path 54 routes the exhaust gas introduced via the only inlet pipe 38 into the muffler housing 12, especially into the first chamber 20, through the fourth chamber 26 and hence through the heat exchanger unit 48 to the first outlet pipe 52 in this muffler 10 as well. The second exhaust gas flow path 56 routes the exhaust gas being fed via the inlet pipe 38 through the first chamber 20, the second chamber 22 and the third chamber 24 to the outlet pipe 40, bypassing the heat exchanger unit 48.

To make it possible to introduce the combustion exhaust gas or a part of the combustion exhaust gas into the first chamber 20, the opening arrangement 40 provided at the exhaust pipe 36 especially in the area of the second chamber 22 is extended into the area of the exhaust pipe 36 or of the inlet pipe 38, which extends in the first chamber 20, so that the combustion exhaust gas or a part thereof can flow via some of the openings of the opening arrangement 44 into the first chamber 20 and via this to the heat exchanger unit 48.

In the length area of the exhaust pipe 36 extending in the third chamber 24 or of the second outlet pipe 40, a branch pipe 46 branches off therefrom, and said branch pipe thus provides a Helmholtz resonator in cooperation with the second chamber 24.

The flow path blocking/releasing device 58 comprises in this embodiment a flow path blocking/releasing member 60 associated with the second flow path 56, for example, in the second outlet pipe 40, preferably in an area outside the heat exchanger housing 12, for example, in the form of an adjustable flap. This flow path blocking/releasing member 60 is also adjustable between a blocked position essentially blocking the second outlet pipe 40 against flow and a released position releasing the second outlet pipe 40 and hence the second exhaust gas flow path 56 for flow. In this embodiment variant as well, an adjustment may take place with these two positions only or a continuous adjustment is possible in order to set the blocking of the second exhaust gas flow path 56 and hence the percentage of the combustion exhaust gas flowing through this path correspondingly continuously or possibly also in increments.

If the flow path blocking/releasing member 60 is brought into its blocked position and, for example, the second exhaust gas flow path 56 is thus blocked against flow in the area of the second outlet pipe 40, the total quantity of combustion exhaust gas fed via the inlet pipe 38 flows into the first chamber 20 and via this into the fourth chamber 26. The combustion exhaust gas flows through the heat exchanger unit 48 and thus transfers heat to the heat transfer medium, which likewise flows through this. The combustion exhaust gas leaves the muffler 10 via the first outlet pipe 52, which cannot be blocked against flow in this embodiment. The Helmholtz resonator provided with the branch pipe 46 in the area of the third chamber 24 is active in this state, and the resonance frequency of the Helmholtz resonator is advantageously tuned to disturbing low frequencies in this case as well. In this embodiment as well, the operating state in which the combustion exhaust gas or a substantial part of the combustion exhaust gas is sent over the first exhaust gas flow path 54 and hence through the heat exchanger unit 48 is advantageously selected when an internal combustion engine is in a state in which especially low frequencies are dominant and thus cannot be attenuated, i.e., for example, in an idle state or in a state with partial load or low or medium speed.

If the flow path blocking/releasing member 60 is brought into its released position, the second exhaust gas flow path 56 is also released for flow. The combustion exhaust gas fed via the inlet pipe 38 can thus leave the muffler 10 via both pipes 52, 40. Based on the lower flow resistance, the greater part of the combustion exhaust gas will flow in this state via the second exhaust gas flow path 56. This means that only a smaller quantity of heat is transferred in the heat exchanger unit 48 to the heat transfer medium flowing through this. This state is especially advantageously used when, for example, only the transfer of a smaller quantity of heat to the heat transfer medium is necessary at high speed or high engine load, because a sufficient quantity of heat can already be provided by the internal combustion engine itself or the thermal interaction thereof with the heat transfer medium, so that, moreover, a thermal overload of the heat exchanger unit 48 is avoided, and, on the other hand, attenuation of especially low frequencies is necessary to a lesser extent only. High frequencies, in particular, e.g., the flow noise, are nevertheless attenuated efficiently due to the presence of the second chamber 22 filled with the muffling material 42.

Taking into account further operating parameters, e.g., the speed of the vehicle and the outside temperature, an even more sensitive tuning of the muffler can be performed in respect to its muffling characteristics, on the one hand, and in respect to its heat transfer characteristics, on the other hand, in both of the above-described embodiments if the respective flow path blocking/releasing member provided there is brought into an intermediate position. Both embodiment variants offer the substantial advantage that, with a compact design, due to the integration of the heat exchanger unit, on the one hand, and different muffling measures, on the other hand, the heat being transported in the combustion exhaust gas can be efficiently utilized, if necessary, on the one hand, and, on the other hand, it can be ensured that, depending on the operating state, efficient muffling of the sound being transported in the exhaust gas is provided. It is, in particular, possible to ensure efficient attenuation of lower frequencies by providing a Helmholtz resonator functionality, especially at low speeds and at low operating loads, while higher frequencies occurring especially also due to the flow noise can be attenuated especially efficiently by the muffling material provided in the second chamber acting as an absorption chamber.

Further, the muffler 10 according to the present invention has the essential advantage that by providing two outlet pipes, the back pressure generated in the muffler is markedly lower compared to a muffler with only a single outlet pipe, which has a favorable effect on the exhaust gas flow and hence on the performance capacity of an internal combustion engine.

While specific embodiments of the invention have been shown and described in detail to illustrate the application of the principles of the invention, it will be understood that the invention may be embodied otherwise without departing from such principles.

What is claimed is:

1. A muffler for an exhaust system of an internal combustion engine, for motor vehicles, the muffler comprising:
   a muffler housing;
   a heat exchanger unit arranged in the muffler housing, the heat exchanger unit being configured for a heat transfer medium and combustion exhaust gas to flow through the heat exchanger unit, for transferring heat from the combustion exhaust gas to the heat transfer medium; and an inlet pipe introducing combustion exhaust gas into the muffler housing;

a first outlet pipe drawing combustion exhaust gas from the muffler housing, wherein a first exhaust gas flow path is provided in the muffler housing for routing combustion exhaust gas through the heat exchanger unit to the first outlet pipe;

a second outlet pipe drawing combustion exhaust gas from the muffler housing, wherein a second exhaust gas flow path is provided in the muffler housing for routing combustion exhaust gas, bypassing the heat exchanger unit, to the second outlet pipe;

a flow path blocking and releasing device configured to block and release, as desired, at least one of the first exhaust gas flow path and the second exhaust gas flow path;

a first chamber provided in the muffler housing, wherein the inlet pipe is open towards the first chamber and the first exhaust gas flow path comprises the first chamber, wherein the heat exchanger unit has an exhaust gas inlet area open towards the first chamber and an exhaust gas outlet area open towards the first outlet pipe.

2. A muffler in accordance with claim 1, wherein:
the flow path blocking and releasing device comprises a flow path blocking and releasing member associated with the first outlet pipe, wherein the flow path blocking and releasing member is adjustable between a released position releasing the first outlet pipe for flow therethrough and a blocked position essentially blocking the first outlet pipe against flow therethrough and the flow path blocking and releasing member is arranged in the first outlet pipe in an area outside the muffler housing; or
the flow path blocking and releasing device comprises a flow path blocking and releasing member associated with the second outlet pipe, wherein the flow path blocking and releasing member is adjustable between a released position releasing the second outlet pipe for flow therethrough and a blocked position essentially blocking the second outlet pipe against flow therethrough and the flow path blocking and releasing member is arranged in the second outlet pipe in an area outside the muffler housing.

3. A muffler in accordance with claim 1, wherein:
the exhaust gas exiting the inlet pipe towards the first chamber enters the heat exchanger at the exhaust gas inlet area open towards the first chamber;
a second chamber is provided in the muffler housing;
the second chamber is filled at least partly with muffling material; and
the inlet pipe is open towards the second chamber.

4. A muffler in accordance with claim 3, wherein the inlet pipe or a pipe connected to the inlet pipe or forming an extension of the inlet pipe passes through the second chamber and has an opening arrangement that is open towards the second chamber.

5. A muffler in accordance with claim 3, wherein the second outlet pipe or a pipe connected to the second outlet pipe or forming an extension of the second outlet pipe is open towards the second chamber.

6. A muffler in accordance with claim 4, wherein:
an exhaust pipe is connected to or forms the inlet pipe; and
the second outlet pipe passes through the first chamber and the second chamber and is open towards the second chamber by the opening arrangement.

7. A muffler in accordance with claim 1, wherein:
a further chamber is provided in the muffler housing;
the second outlet pipe or a pipe connected to the second outlet pipe or forming an extension of the second outlet pipe is open towards the further chamber.

8. A muffler in accordance with claim 1, wherein:
a further chamber, at least partially containing the heat exchanger unit, is provided in the muffler housing;
the further chamber is open in the area of the exhaust gas inlet area towards the first chamber;
the first outlet pipe or a pipe connected to the first outlet pipe or forming an extension of the first outlet pipe is open towards the further chamber in an area of the exhaust gas outlet area.

9. A muffler in accordance with claim 1, wherein the inlet pipe or a pipe connected to the inlet pipe or forming an extension of the inlet pipe is open towards the first chamber via a branch pipe branching off therefrom.

10. A muffler in accordance with claim 9, wherein:
a further chamber is provided in the muffler housing;
the second outlet pipe or a pipe connected to the second outlet pipe or forming an extension of the second outlet pipe is open towards the further chamber.

11. A muffler in accordance with claim 10, wherein the flow path blocking and releasing device comprises a flow path blocking and releasing member associated with the first outlet pipe.

12. A muffler in accordance with claim 1, wherein the inlet pipe or a pipe connected to the inlet pipe or forming an extension of the inlet pipe is open towards the first chamber via an opening arrangement.

13. A muffler in accordance with claim 7, wherein the second outlet pipe or a pipe connected to the second outlet pipe or forming an extension of the second outlet pipe is open towards the further chamber via a branch pipe branching off therefrom.

14. A muffler in accordance with claim 13, wherein the flow path blocking and releasing device comprises a flow path blocking and releasing member associated with the second outlet pipe.

15. A muffler in accordance with claim 3, wherein the first chamber and the second chamber are arranged following one another in a direction of a muffler housing longitudinal axis.

16. A muffler in accordance with claim 3, wherein:
a third chamber is provided in the muffler housing;
the second outlet pipe or a pipe connected to the second outlet pipe or forming an extension of the second outlet pipe is open towards the third chamber; and
the second chamber is arranged between the first chamber and the third chamber in a direction of the muffler housing longitudinal axis.

17. A muffler in accordance with claim 3, wherein:
a third chamber is provided in the muffler housing;
the second outlet pipe or a pipe connected to the second outlet pipe or forming an extension of the second outlet pipe is open towards the third chamber;
a fourth chamber, at least partially containing the heat exchanger unit, is provided in the muffler housing;
the fourth chamber is open in the area of the exhaust gas inlet area towards the first chamber;
the first outlet pipe or a pipe connected to the first outlet pipe or forming an extension of the first outlet pipe is open towards the fourth chamber in an area of the exhaust gas outlet area;
the second chamber and the fourth chamber are arranged next to one another in at least some areas in the direction of a muffler housing longitudinal axis.

18. An exhaust system for a vehicle with a hybrid drive, the exhaust system comprising a muffler, the muffler comprising:
- a muffler housing;
- a heat exchanger unit arranged in the muffler housing, the heat exchanger unit being configured for a heat transfer medium and combustion exhaust gas to flow through the heat exchanger unit, for transferring heat from the combustion exhaust gas to the heat transfer medium; and
- an inlet pipe introducing combustion exhaust gas into the muffler housing;
- a first outlet pipe drawing combustion exhaust gas from the muffler housing, wherein a first exhaust gas flow path is provided in the muffler housing for routing combustion exhaust gas through the heat exchanger unit to the first outlet pipe;
- a second outlet pipe drawing combustion exhaust gas from the muffler housing, wherein a second exhaust gas flow path is provided in the muffler housing for routing combustion exhaust gas, bypassing the heat exchanger unit, to the second outlet pipe; and
- a flow path blocking and releasing device configured to block and release, as desired, at least one of the first exhaust gas flow path and the second exhaust gas flow path;
- a first chamber provided in the muffler housing, wherein the inlet pipe is open towards the first chamber and the first exhaust gas flow path comprises the first chamber, wherein the heat exchanger unit has an exhaust gas inlet open towards the first chamber and an exhaust gas outlet area open towards the first outlet pipe.

19. An exhaust system in accordance with claim 18, further comprising at least one additional muffler wherein the muffler is arranged upstream in relation to the at least one additional muffler, wherein the exhaust gas exiting the inlet pipe towards the first chamber enters the heat exchanger at the exhaust gas inlet area open towards the first chamber.

20. A muffler for an exhaust system of an internal combustion engine, for motor vehicles, the muffler comprising:
- a muffler housing comprising a muffler housing wall having an opening, the muffler housing wall defining at least a portion of a chamber;
- a heat exchanger unit arranged in the muffler housing, the heat exchanger unit being configured for a heat transfer medium and combustion exhaust gas to flow through the heat exchanger unit, for transferring heat from the combustion exhaust gas to the heat transfer medium;
- an inlet pipe introducing combustion exhaust gas into the muffler housing, at least a portion of the inlet pipe being arranged in the opening;
- a first outlet pipe drawing combustion exhaust gas from the muffler housing, the chamber being in fluid communication with the inlet pipe, the heat exchanger unit and the first outlet pipe, the chamber, the heat exchanger unit and the first outlet pipe defining at least a portion of a first exhaust gas flow path in the muffler housing;
- a second outlet pipe drawing combustion exhaust gas from the muffler housing, at least a portion of the inlet pipe and the second outlet pipe defining a second exhaust gas flow path in the muffler housing, wherein the second exhaust gas flow path bypasses the heat exchanger unit;
- a flow path blocking and releasing device configured to block and release, as desired, at least one of the first exhaust gas flow path and the second exhaust gas flow path.

* * * * *